United States Patent [19]

Darrow

[11] 3,746,876

[45] July 17, 1973

[54] APPARATUS FOR PROVIDING A DELAYED VEHICLE CONTROL SIGNAL

[75] Inventor: John O. G. Darrow, Murrysville, Pa.

[73] Assignee: Westinghouse Electric Corporation, Pittsburgh, Pa.

[22] Filed: Sept. 18, 1972

[21] Appl. No.: 290,051

[52] U.S. Cl. .................................. 307/10 R, 340/62

[51] Int. Cl. .................................................. B60g 1/00

[58] Field of Search ...................... 307/10 R; 340/62, 340/168

[56] References Cited

UNITED STATES PATENTS 3,562,712 2/1971 Thorne-Booth et al. ........... 340/168

3,656,099 4/1972 Campbell.............................. 340/62

*Primary Examiner*—James D. Trammell

*Attorney*—F. H. Henson, Jack M. Arnold et al.

[57] ABSTRACT

A periodic input signal is detected and then delayed for a predetermined amount of time. The delayed signal is then used to close a switch which then provides an enable signal for allowing a gate to pass the periodic input signal. The periodic input signal provided at the output of the latter gate is then detected and used as a vehicle control signal.

7 Claims, 3 Drawing Figures

APPARATUS FOR PROVIDING A DELAYED VEHICLE CONTROL SIGNAL

CROSS REFERENCE TO RELATED APPLICATIONS

Reference is made to U.S. Pat. No. 3,562,712 entitled "Remote Transmission of Control Signal", filed May 11, 1967 on behalf on G. M. Thorne-Booth et al, and which is assigned to the assignee of the present invention.

BACKGROUND OF THE INVENTION

In any control system, for example a vehicle control system, a provided input signal must be verified as being a valid signal such that resultant control signals are not provided in response to system noise or incorrect input signals. An input signal, therefore, must be manifested for a predetermined amount of time before a control signal is generated to insure that a noise signal does not initiate system operation. Also, there is a need to insure that resultant signals are terminated substantially at the same time the controlling input signal is terminated such that succeeding control signals are not provided after the cessation of the input signal.

According to the teachings of the present invention, a circuit is disclosed wherein a fail-safe vehicle control signal is provided which has a leading edge which occurs a predetermined amount of time after the leading edge of a provided input signal, and the lagging edge of which occurs substantially at the same time as the lagging edge of the provided input signal.

SUMMARY OF THE INVENTION

A circuit for providing a vehicle control signal has a circuit input terminal to which a periodic signal is applied. A detected signal is then provided in response to the provision of the periodic signal to the circuit input terminal. Means are provided for producing a delayed signal in response to the provision of the latter detected signal. Also included are gate means which are responsive to the concurrent provision of the detected signal and the delayed signal for providing an enable signal. A gate means then provides a gate output signal in response to the concurrent provision of the periodic input signal and the enable signal to the respective input terminals of the gate means. There are means responsive to the provision of the gate output signal for providing a vehicle control signal, and which further includes means for coupling the vehicle control signal to one of the inputs of the gate means for maintaining the gate means enabled as long as the periodic signal is provided.

DESCRIPTION OF THE PREFERRED EMBODIMENTS

Figure 1:
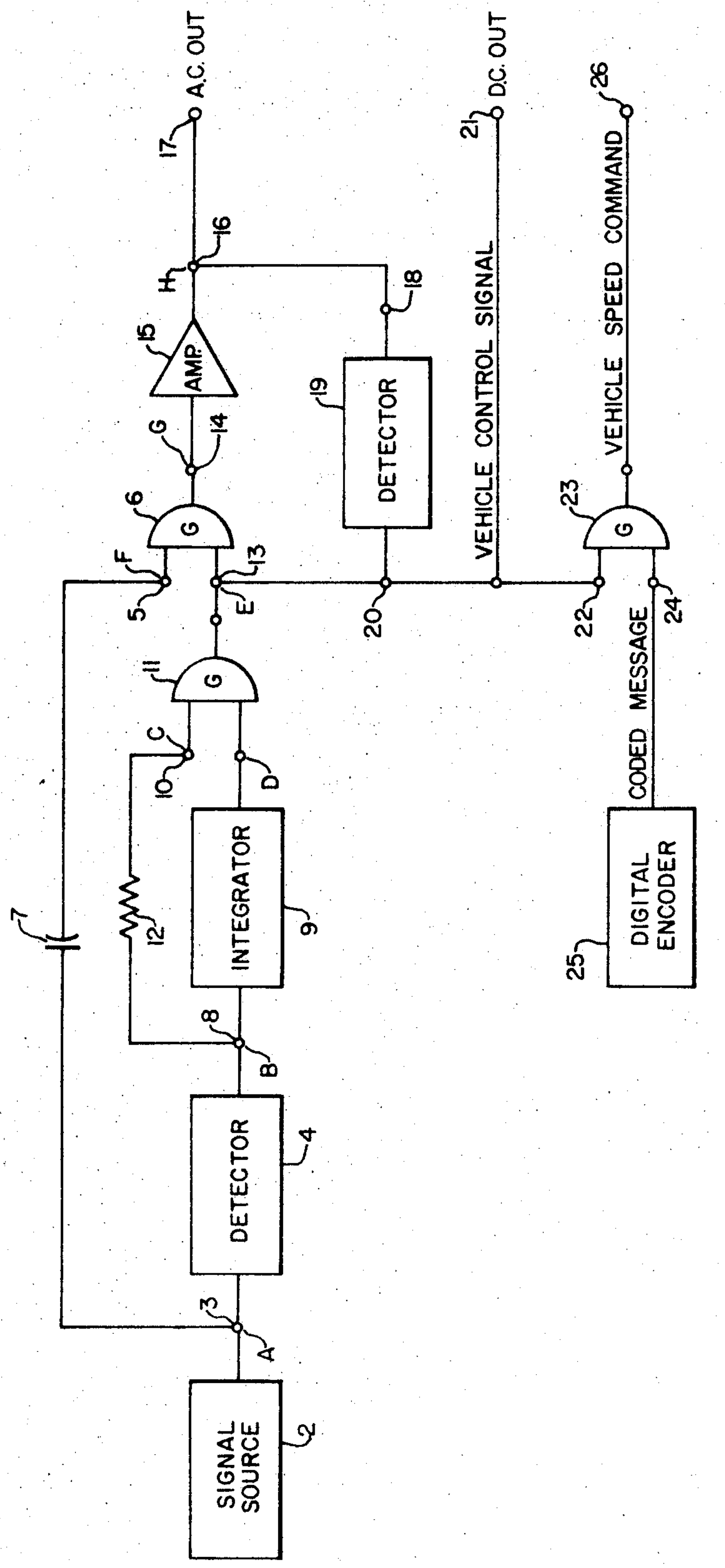
FIG. 1 is a block diagram representation of a vehicle control circuit embodying the teachings of the present invention.
Figure 3:
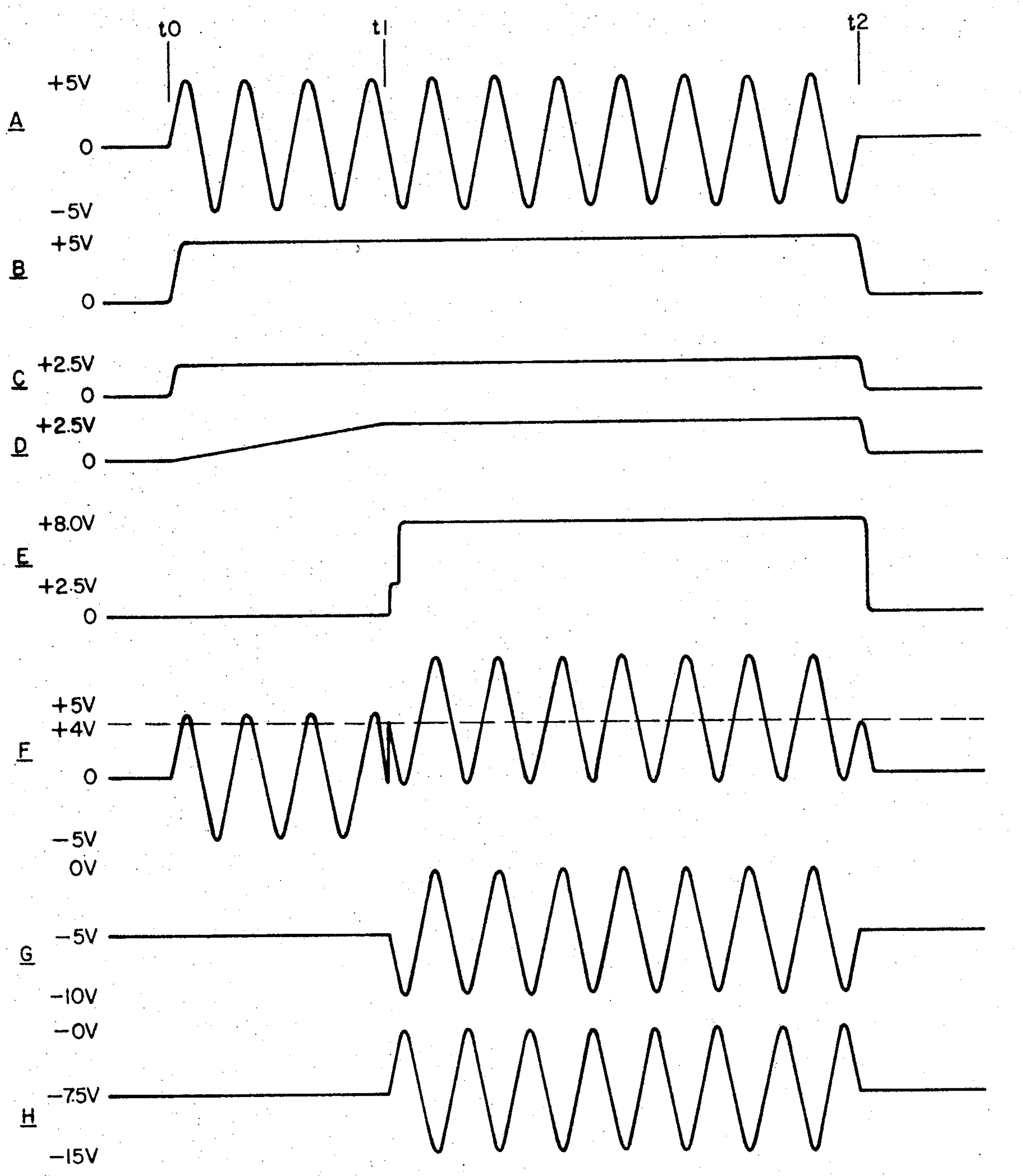
FIG. 3 is a waveform relationship drawing helpful in the understanding of FIGS. 1 and 2.

Refer now to FIG. 1, wherein the letters A–H respectively, are indicative of the circuit points at which the waveshapes A–H of FIG. 3 are present in the circuit of FIG. 1. A signal source 2 which for example, may be an oscillator provides a periodic input signal (See waveshape A of FIG. 3) to the input 3 of a detector 4 and to a first input terminal 5 of a gate 6 by way of a signal coupling device such as the capacitor 7. The detector 4 provides a detected DC signal (See waveshape B of FIG. 3) to the input 8 of a delay means such as an integrator 9 and to a first input terminal 10 of a gate 11 by way of an impedance means such as the resistor 12 (See waveshape C of FIG. 3). The output of the gate 11 therefore is a delayed DC signal, the delay time of which is determined by the integrator 9. The delayed DC signal (See waveshape E of FIG. 3) is provided to the second input terminal 13 of the gate 6. The delayed DC signal then permits the gate 6 to pass the periodic input signal which is provided to the input terminal 5 (See waveshape F of FIG. 3) which periodic input signal is then manifested at the output terminal 14 of the gate 6 (See waveshape G of FIG. 3) and which is then provided to the input terminal of an inverting amplifier 15 which provides an inverted periodic signal at its output terminal 16 which is coupled to a circuit output terminal 17 and to an input terminal 18 of a detector 19. The detected signal provided at the output terminal 20 of the detector 19 (See waveshape E of FIG. 3) is coupled to the input terminal 13 of gate 6 for maintaining the latter gate enabled so long as the periodic input signal is provided to the gate input terminal 5. The latter detected signal is also coupled to a circuit output terminal 21 as a DC vehicle control signal and to the input terminal 22 of a gate 23 which has a coded message provided to a second input terminal 24 from a digital encoder 25. The digital encoder 25 may take the form of a speed encoder as disclosed in the previously referenced U.S. Pat. No. 3,562,712. In response to the concurrent provision of the detected signal to the input terminal 22 and the coded message such as the speed command to the input terminal 24 of the gate 23 a vehicle speed command is then provided at a circuit output terminal 26.

Figure 2:
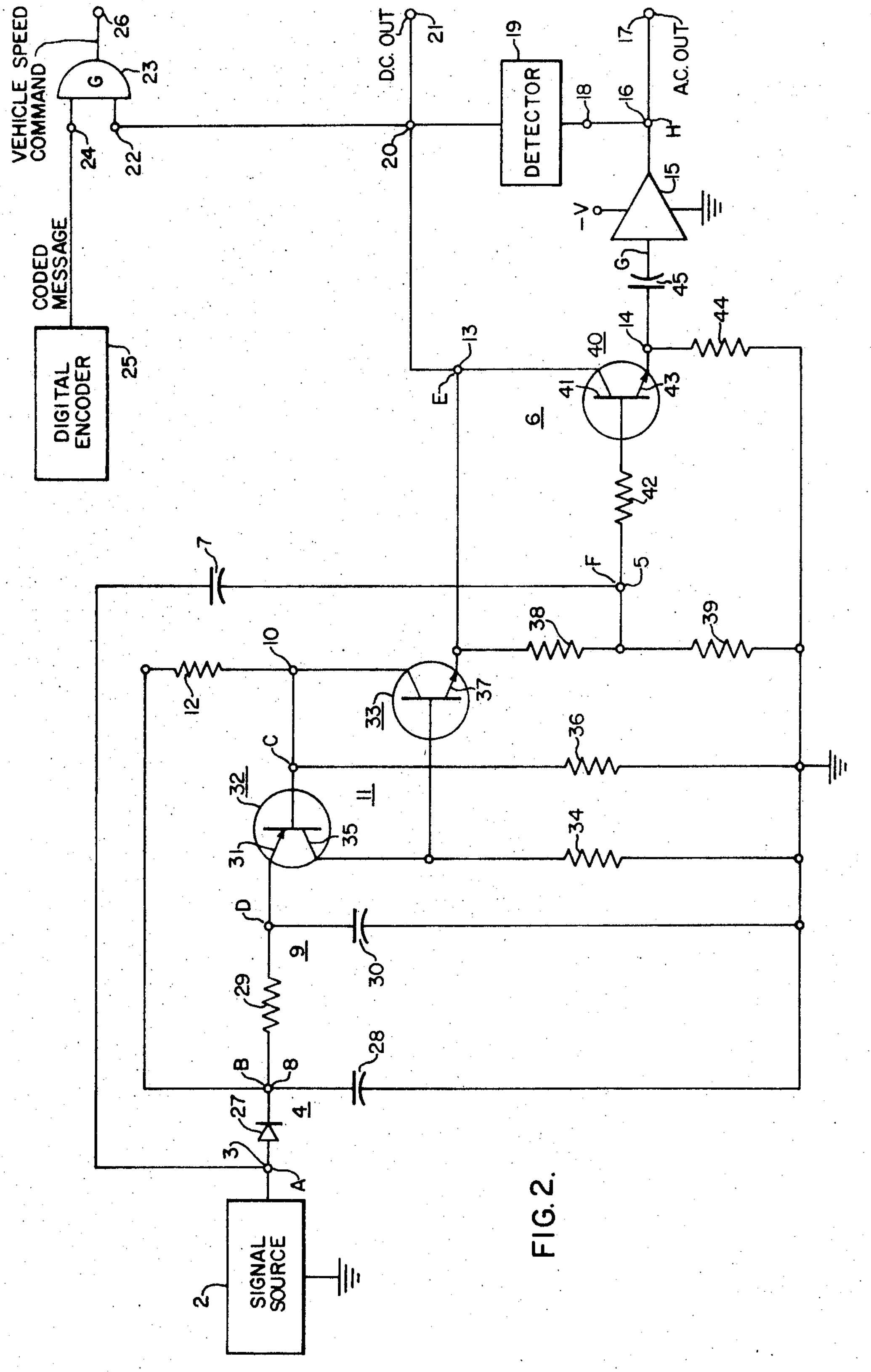
FIG. 2 is a schematic diagram representation of a vehicle control circuit embodying the teachings of present invention.

Refer now to FIG. 2 wherein the letters A–H are indicative of the circuit points at which the waveshapes A–H of FIG. 3 are manifested in the circuit of FIG 2. The signal source 2 is coupled to the input terminal 3 of the detector 4 which is comprised of a unidirectional current means such as the diode 27 and a charge storage means such as the capacitor 28. The capacitor 28 is chosen to have a capacitance low enough to reduce ripple in the frequency band of interest. For example, if the input signal frequency is 10 Khz, the capacitor 28 would have a value on the order of 5.0 microfarads. The common connection of the diode 27 and the capacitor 28 forms the input terminal 8 of the integrator 9 which is comprised of a resistor 29 in a charge storage device such as the capacitor 30. The time constant of the integrator 9 is chosen such that the delay time for the circuit is correct for proper noise rejection. The common connection of the resistor 29 and the capacitor 30 is connected to the emitter electrode 31 of a transistor 32 which forms part of the gate circuit 11 along with a transistor 33. A resistor 34 is connected to the collector electrode 35 of the transistor 32 and the opposite end thereof is connected to the circuit ground. The resistor 34 functions as a ground return for the transistor 32. A resistor 36 is connected to the input terminal 10 of the gate 11 and the resistors 12 and 36 function as a voltage divider which determines the point at which the transistors 32 and 33 are turned on. The transistors 32 and 33 function as a switching stage or gate circuit as will be explained shortly. The emitter electrode 37 of the transistor 33 is connected to the input terminal 13 of the gate 6 and also to a resistor 38 which has the other end thereof connected to a resistor 39 which is connected to circuit ground. The resistors 38 and 39 function as a voltage divider to provide bias for the transistor 40 which functions as the gate 6. The base electrode 41 of the transistor 40 is coupled to the gate input terminal 5 by way of a resistor 42. The resistor 42 is chosen to have an impedance value large enough to keep the current flow into the base electrode 41 of a low enough value such that the transistor 40 does not turn on prior to its collector voltage level being at a proper positive operating level. The emitter electrode 43 of the transistor 40 is connected to circuit ground by way of a resistor 44 and to the input of the inverting amplifier 15 by way of a coupling capacitor 45. The resistor 44 functions as a load resistor for the transistor 40. The amplifier 15 is connected to a source of negative operating potential −V which, for example, may be of a level of −15 volts. The output of the amplifier 15 is then connected to the input terminal 18 of detector 19 and to the circuit output terminal 17.

At a time to the signal source 2 provides a periodic input signal to the input terminal 3 of the detector 4 and to the input terminal 5 of the gate 6 by way of the coupling capacitor 7 (See waveshape A of FIG. 3). The detector 4 then detects the positive portion of the provided input signal and the detected signal is provided to the input terminal 8 of the integrator 9 (See waveshape B of FIG. 3) and to the input terminal 10 of the gate 11 by way of the resistor 12 (See waveshape C of FIG. 3). The signal provided to the input terminal 10 is of a level somewhat less than the level of the detected signal as is determined by the voltage divider comprised of the resistors 12 and 36. In the present embodiment, the resistance values are chosen such that the signal appearing at the terminal 10 is on the order of one-half of the voltage appearing at the terminal 8. As was previously explained, these resistors determined the turn on potential for the gate 11. In response to the detected signal appearing at the terminal 8, the integrator 9 begins to integrate, that is, the capacitor 30 begins to charge towards the level of the applied detected signal. When the charge on the capacitor 30 reaches substantially the level of the signal at the terminal 10, the transistors 32 and 33 become conductive. When the transistors 32 and 33 initially turn on, current flows through the emitter collector path of transistor 32 to the base emitter path of the transistor 33 and the circuit input terminal 13, which is the collector electrode of the transistor 40. The resultant voltage at terminal 13 is essentially at the same potential as the charge on the capacitor 30 less the small voltage drop across the transistors. In the embodiment shown, this voltage is essentially 2.5 volts. As was previously explained, the periodic input signal is at this time applied to the input terminal of input terminal 5 of the gate 6. The transistor 40 therefore becomes conductive and current flows through the latter transistor and the resultant periodic signal appearing at the emitter electrode 43 is coupled to the input of the inverting amplifier 15 by way of a coupling capacitor 45. The inverted signal appearing at the output of the amplifier 15 (See waveshape H of FIG. 3) is coupled to the circuit output terminal 17 and to the input terminal 18 of the detector 19. The positive voltage appearing at the output terminal 20 of the detector 19 is then coupled to the input terminal 13 to provide continued operating potential for the transistor 40. This DC signal then jumps to a positive level on the order of +8.0 volts (See waveshape E of FIG. 3, *t1*). At the time t1, when the transistors 32, 33 and 40 become conductive, the periodic signal applied to the input terminal 5 of the gate 6 jumps from a zero volt DC level to a +4 volt DC reference level and remains at this level until the latter transistors are made non-conductive due to the cessation of the input signal which occurs at the time t2.

The DC output signal is also coupled to the circuit output terminal 21 and to the input terminal 22 of the gate 23 enabling the gate 23 to pass the coded message applied to its input terminal 24 from the digital encoder 25. The output signal manifested at the terminal 26 may be, as was previously explained, a vehicle speed command for vehicles operational in the system. This vehicle speed command is delayed a predetermined amount of time from the original provision of the periodic signal from the signal source 2 as was determined by the time constant of the integrator 9.

The provided circuit is fail-safe in its operation and prevents the generation of a signal due to noise and also assures the dropping out of output signal essentially at the same time the input signal ceases. It is seen that the output signal ceases due to any malfunction of the circuit since if, for example, the signal source no longer provides a periodic input signal there is no periodic input signal provided to the transistor 40 and accordingly no operating potential for the transistor 40 is provided since the transistors 32 and 33 are cut off. Also, it is seen that no possible short from the internal power supply could maintain an output signal since the internal operating power supply is at a negative level, i.e., −V volts applied to the amplifier 15, whereas the transistor 40 is maintained conductive by a positive potential applied from either one of the detector 19 or the gate circuit 11. Any shorting of the amplifier 15 would provide no meaningful operating potential for the transistor 40. Clearly the provided circuit does not energize prior to the delay time determined by the capacitor 30. If the capacitor 30 were to short the periodic input signal is shorted to ground and therefore no output signal can be provided. The resistor 29 is chosen to be of such a value that if the capacitor 30 opens or the gate 11 shorts there is not enough power supplied by way of the resistor 29 to turn on the transistor 40. That is, the resistance values of resistor 29 as well as resistor 42 are large relative to the current requirements for the base circuit of the transistor 40.

In summary, a vehicle control circuit has been disclosed in which a periodic signal applied to the input of the circuit is not manifested at the output of the circuit until a predetermined amount of time after the provision of the input signal, and the output signal ceases substantially at the same time as the cessation of the input signal.

What I claim is:

1. A circuit for providing a vehicle control signal, comprising in combination:

a circuit input terminal to which a periodic signal may be applied;

means for providing a detected signal in response to the provision of the periodic signal to said circuit input terminal;

means for providing a delayed signal in response to the provision of said detected signal;

means responsive to the concurrent provision of said detected signal and said delayed signal for providing an enable signal;

gate means having first and second input terminals and output terminal at which a gate output signal is provided in response to the concurrent provision of respective signals to the first and second input terminals, with the first input terminal being coupled to said circuit input terminal, and the second input terminal being coupled to receive the provided enable signal; and means responsive to the provision of said gate output signal for providing said vehicle control signal, and including means for coupling said vehicle control signal to the second input terminal of said gate means.

2. The combination claimed in claim 1, wherein said means for providing a delayed signal comprises an integrator.

3. The combination claimed in claim 2, wherein said means responsive to the provision of said gate output control signal comprises a detector.

4. The combination claimed in claim 3 including:

a digital encoder for providing a coded message; and means responsive to the concurrent provision of said vehicle control signal and said coded message for providing a vehicle speed command.

5. A circuit for providing a vehicle control signal, comprising in combination:

a circuit input terminal to which a periodic input signal may be applied;

means for providing a detected signal in response to the provision of the periodic signal to said circuit input terminal;

integrator means for providing an integrated signal in response to the provision of said detected signal;

means for providing an enable signal in response to the concurrent provision of said detected signal and said integrated signal;

gate means having first and second input terminals and an output terminal at which a gate output signal is provided in response to the concurrent provision of said periodic signal to the first input terminal and said enable signal to the second input terminal; and detector means for providing said vehicle control signal in response to the provision of said gate output signal, and including means for coupling said vehicle control signal to the second input terminal of said gate means.

6. The combination claimed in claim 5 wherein said means for providing an enable signal comprises first and second transistors, each having base, emitter, and collector electrodes with the base electrode of the first being connected to the collector electrode of the second and being connected to receive said detected signal, the collector electrode of the first being connected to the base electrode of the second, the emitter electrode of the first being connected to receive said integrated signal, and the emitter electrode of the second being the circuit point at which said enable signal is manifested.

7. The combination claimed in claim 6 wherein said gate means comprises a third transistor having base, emitter, and collector electrodes, with the base electrode being connected to the circuit input terminal and either one of the emitter electrode or the collector electrode being connected to the emitter electrode of said second transistor and the output of said detector means, with the remaining one of the collector and emitter electrodes being connected to the input of said detector means.

* * * * *